US008851237B2

(12) United States Patent
Stone

(10) Patent No.: US 8,851,237 B2
(45) Date of Patent: Oct. 7, 2014

(54) VARIABLE-CAPACITY SELF-ADJUSTING PNEUMATIC LOAD ELEVATOR

(75) Inventor: Robert M. Stone, Tucson, AZ (US)

(73) Assignee: Bishamon Industries Corporation, Ontario, CA (US)

( * ) Notice: Subject to any disclaimer, the term of this patent is extended or adjusted under 35 U.S.C. 154(b) by 437 days.

(21) Appl. No.: 12/765,811

(22) Filed: Apr. 22, 2010

(65) Prior Publication Data

US 2011/0259675 A1 Oct. 27, 2011

(51) Int. Cl.

| | |
|---|---|
| ***B66F 7/06*** | (2006.01) |
| ***B66B 9/02*** | (2006.01) |
| ***B66B 9/04*** | (2006.01) |
| ***B66F 3/35*** | (2006.01) |
| ***F16F 9/43*** | (2006.01) |
| ***B66F 7/08*** | (2006.01) |

(52) U.S. Cl.

CPC ................. *B66F 7/065* (2013.01); *B66F 7/085* (2013.01)

USPC ............. 187/211; 187/269; 187/273; 60/416; 254/2 C; 254/93 HP; 267/64.28

(58) Field of Classification Search

USPC .... 254/122, 124, 126, 2 C, 8 C, 89 H, 93 HP; 60/416; 92/134, 130 B; 187/240, 250, 187/269, 273, 274, 275, 211; 108/147; 248/631; 267/64.28

See application file for complete search history.

(56) References Cited

U.S. PATENT DOCUMENTS

| | | | | |
|---|---|---|---|---|
| 2,591,641 | A * | 4/1952 | Troendle | 137/102 |
| 2,977,763 | A * | 4/1961 | Mercier | 60/416 |
| 3,174,722 | A * | 3/1965 | Alm | 254/93 HP |
| 3,204,573 | A * | 9/1965 | Mercier | 137/565.19 |
| 3,593,824 | A * | 7/1971 | Gregory | 254/386 |
| 3,666,038 | A * | 5/1972 | Hudspeth et al. | 180/302 |
| 3,680,311 | A * | 8/1972 | Harbonn et al. | 60/404 |
| 4,022,269 | A * | 5/1977 | Segawa | 164/314 |
| 4,191,016 | A * | 3/1980 | Roth et al. | 60/371 |
| 4,323,141 | A * | 4/1982 | Ragan et al. | 187/204 |
| 4,461,444 | A | 7/1984 | Grassi | |
| 4,674,280 | A * | 6/1987 | Stuhr | 60/413 |
| 4,731,997 | A * | 3/1988 | Hagin | 60/416 |
| 5,199,690 | A * | 4/1993 | Marshall | 267/64.25 |
| 5,299,906 | A | 4/1994 | Stone | |
| 5,374,077 | A * | 12/1994 | Penzotti et al. | 280/683 |
| 5,419,534 | A * | 5/1995 | Vesely | 254/9 C |
| 5,507,144 | A * | 4/1996 | Gray et al. | 60/327 |
| 5,771,816 | A * | 6/1998 | Zaguroli, Jr. | 108/147 |
| 6,167,701 | B1 * | 1/2001 | Hatcher et al. | 60/416 |
| 6,874,772 | B2 * | 4/2005 | Oldenettel | 267/64.28 |
| 8,172,237 | B2 * | 5/2012 | Peterson | 280/5.515 |

* cited by examiner

*Primary Examiner* — William E Dondero

*Assistant Examiner* — Minh Truong

(74) *Attorney, Agent, or Firm* — Antonio R. Durando

(57) ABSTRACT

A pneumatic system with multiple air reservoirs is connected to the bellows of a load elevator. A plurality of valves enables the optional pneumatic connection of different combinations of reservoirs so as to change the range of operation of the elevator to meet the self-adjusting weight requirements of a particular job at hand. In the preferred embodiment, the air actuator is pneumatically connected to a main air reservoir, which in turn can optionally be coupled in series with one or two additional reservoirs of different capacities. As a result of this configuration of its pneumatic system, the elevator can be switched between and operated at three different load levels, at the convenience of the operator, without changing the amount of air in the system.

13 Claims, 8 Drawing Sheets

VARIABLE-CAPACITY SELF-ADJUSTING PNEUMATIC LOAD ELEVATOR

BACKGROUND OF THE INVENTION

1. Field of the Invention

The invention relates generally to load elevators for use in loading and unloading objects; in particular, it relates to load elevators that can self-adjust to maintain the level of a changing load at a convenient predetermined height.

2. Description of the Prior Art

In the process of handling objects, such as packages in a warehouse, the objects are commonly transferred manually from a pallet resting on the floor to a table, conveyor, etc., or vice versa. While the table or conveyor remains at a fixed height, the top of the load on the pallet varies in height as the objects accumulate on or are removed from the pallet. This varying elevation of the objects to be handled is fatiguing and can be hazardous for the person doing the moving. Therefore, elevators have been developed for raising the pallet from the floor to a more convenient height and also for automatically adjusting the height of the pallet to a varying optimal position as the load increases or decreases.

For example, U.S. Pat. No. 4,764,075 describes a scissor elevator supported by helical metal springs that maintain the top of the at a preset height above the floor as boxes are added or removed. U.S. Pat. No. 5,299,906 describes a self-adjusting pneumatic scissor elevator with an air actuator system that includes a compressible air actuator or bellows and a fixed-volume reservoir. The bellows, mounted between the scissors linkage and the load platform, is compressible between specified maximum and minimum bellows heights that correspondingly determine substantially different maximum and minimum bellows volumes. The air reservoir is coupled to the bellows and has a fixed volume that is substantially larger than the difference between the maximum and minimum volumes of the bellows. As a result, during loading or unloading the height of the platform changes so as to maintain the top of the load at substantially the same level while objects are being added to or removed from the platform.

As evidenced by its commercial success, the load elevator of the '906 patent represented a significant improvement in the art. However, once the pressure in the pneumatic system is set, the performance of the elevator is fixed according to a predetermined height-versus-load curve that depends, in large part, on the volume of the reservoir. In the field, the operator is normally not allowed to change the system pressure or, if permitted to do so, a pressurized source of air may not be readily available. Therefore, because the performance curve of the elevator is fixed for a given system pressure regardless of the density of the load being handled, the height of the platform cannot be optimal for all weights. That is, heavier objects (those with a higher density) will lower the platform more rapidly than lighter objects. If the elevator pressure is set for a lighter load, this means that the operator will have to work at a lower height than would be optimal if the pressure were set for the heavier load (and vice versa).

This is a problem in environments where the loads being handled vary materially from shipment to shipment. For example, referring to FIG. 1, an elevator like the one described in the '906 patent is designed to produce a travel of 20 inches from the top elevation of the platform (at a height of 30 inches) to the bottom elevation (at a height of 10 inches). Obviously, the maximum load required to produce the complete lowering of the platform depends on the pressure of the pneumatic system. As indicated by the first curve on the left of the figure, the platform will reach it lowest height when the load is 500 pounds if the system pressure is set at 16 psi. As the load on the platform increases, the travel of the platform is roughly linear, which is the desired performance if the density of a uniform load is such that the platform is fully loaded when 500 pounds of material are placed on it. If, on the other hand, the material is twice as dense, for instance, it is clear that the platform will reach its lowest point (at 10 inches of height) when the platform is only half loaded, which means that most of the time the operator will be working at a lower height than optimal.

The reverse problem occurs if the pressure is set high for heavier loads and a lighter one is handled instead. Referring to the last curve on the right in FIG. 1, for example, with a system pressure set at 75 psi the platform would begin descending at 800 pounds and would reach it lowest point only when the load is at 2,150 pounds. Thus, if the weight of the material being handled were such that 500 pounds of it would be sufficient to completely load the platform, the operator would have to place the material at an increasingly higher elevation over a platform that would remain at the constant elevation of 30 inches (because it would not start moving until 800 pounds were placed on it).

This can be a serious drawback when the operator cannot change the system pressure to conform to the requirements of the job at hand. Therefore, it would be very useful to be able to operate a system charged with a given initial pressure so as to change the load required to lower the platform to its lowest height. That is, it would be very advantageous to be able to combine the performance curves of FIG. 1 to obtain multiple maximum-load capabilities from a common minimum-load initial pressure. The present invention is directed at solving this problem by providing a self-contained system with optional settings that allow the operator to handle loads of materially different density at substantially the same work elevation throughout the range of motion of the platform.

SUMMARY OF THE INVENTION

The invention lies in a pneumatic system with multiple air reservoirs connected to the elevator bellows through a plurality of valves that permit the optional pneumatic connection of different combinations of reservoirs so as to change the range of operation of the elevator to meet the weight requirements of the job at hand. The elevator comprises a base, a horizontal load platform, a vertically expandable scissors linkage coupled between the load platform and the base, and an air actuator chamber or bellows mechanically coupled between the base and the scissor linkage.

In the preferred embodiment of the invention, the air actuator is pneumatically connected to a main air reservoir, which in turn can optionally be coupled in series with either one or two additional reservoirs of different capacities. As a result of this configuration of its pneumatic system, the elevator can be switched between and operated in a self-adjusting mode at three different load levels, at the convenience of the operator, without changing the amount of air in the system.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only one of the various ways in which the invention may be practiced.

DESCRIPTION OF THE PREFERRED EMBODIMENTS

Figure 2:
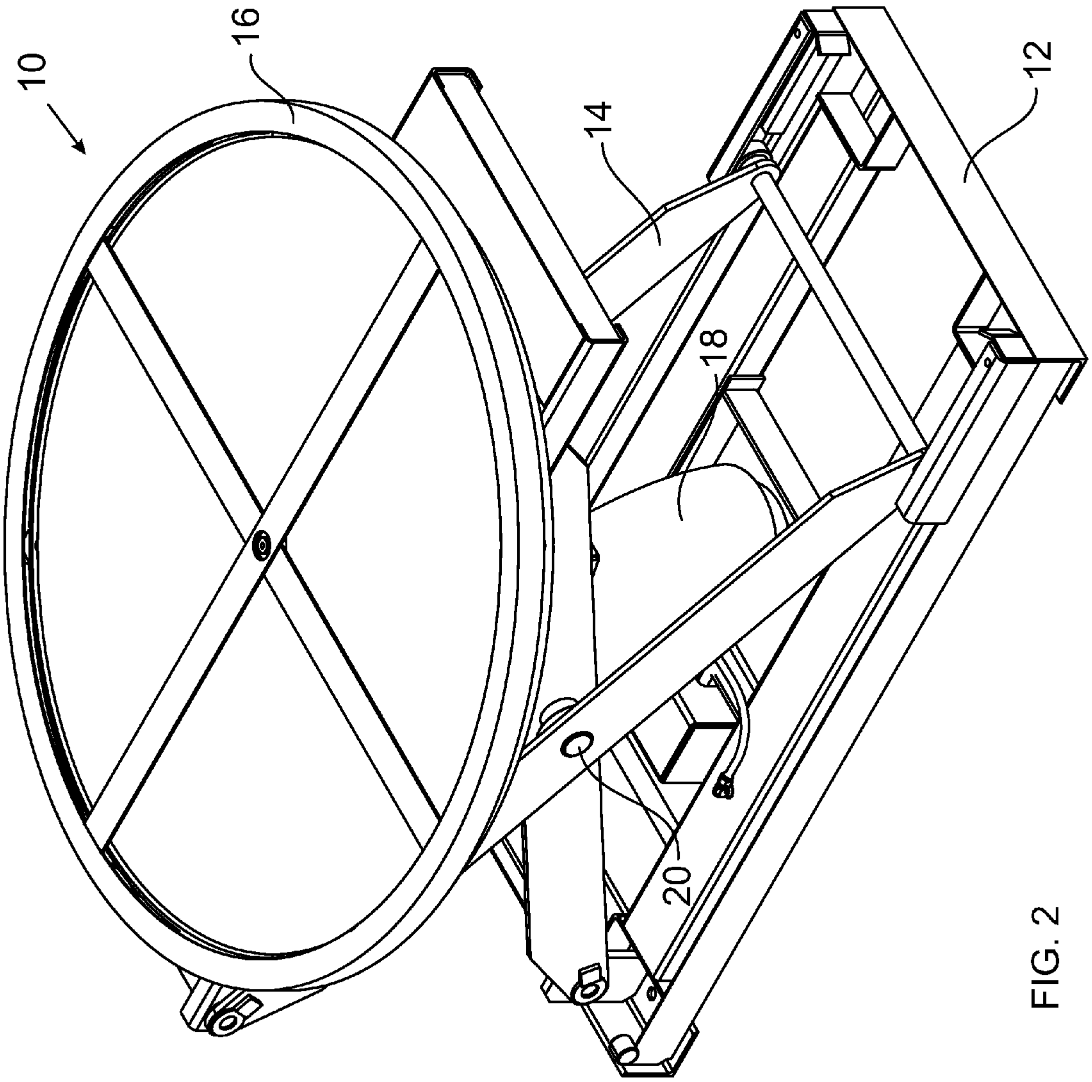
FIG. 2 is a perspective view of a self-adjusting elevator according to the invention.

Referring to FIG. 2, the numeral 10 identifies a self-adjusting elevator in accordance with the invention. The elevator includes a base 12 that rests on a substantially horizontal underlying surface, a conventional scissor mechanism 14, and a load platform 16 that may be rotated for convenience of the operator. The scissor mechanism connects the platform to the base and elevates the platform as a function of its motion from a retracted, lower position to an extended, higher position. The motion of the scissor mechanism 14 is actuated by an air actuator 18 (also normally referred to in the art as a bellows or air spring) mounted between the base and the intermediate axle 20 of the scissor mechanism 14. (One skilled in the art would understand that the bellows may alternatively be coupled in different ways, such as between the scissor mechanism and the platform, or directly between the base and the platform.) As the bellows is pressurized, it expands upward, thereby extending the scissor mechanism and lifting the platform 16 to a higher elevation.

Figure 1:
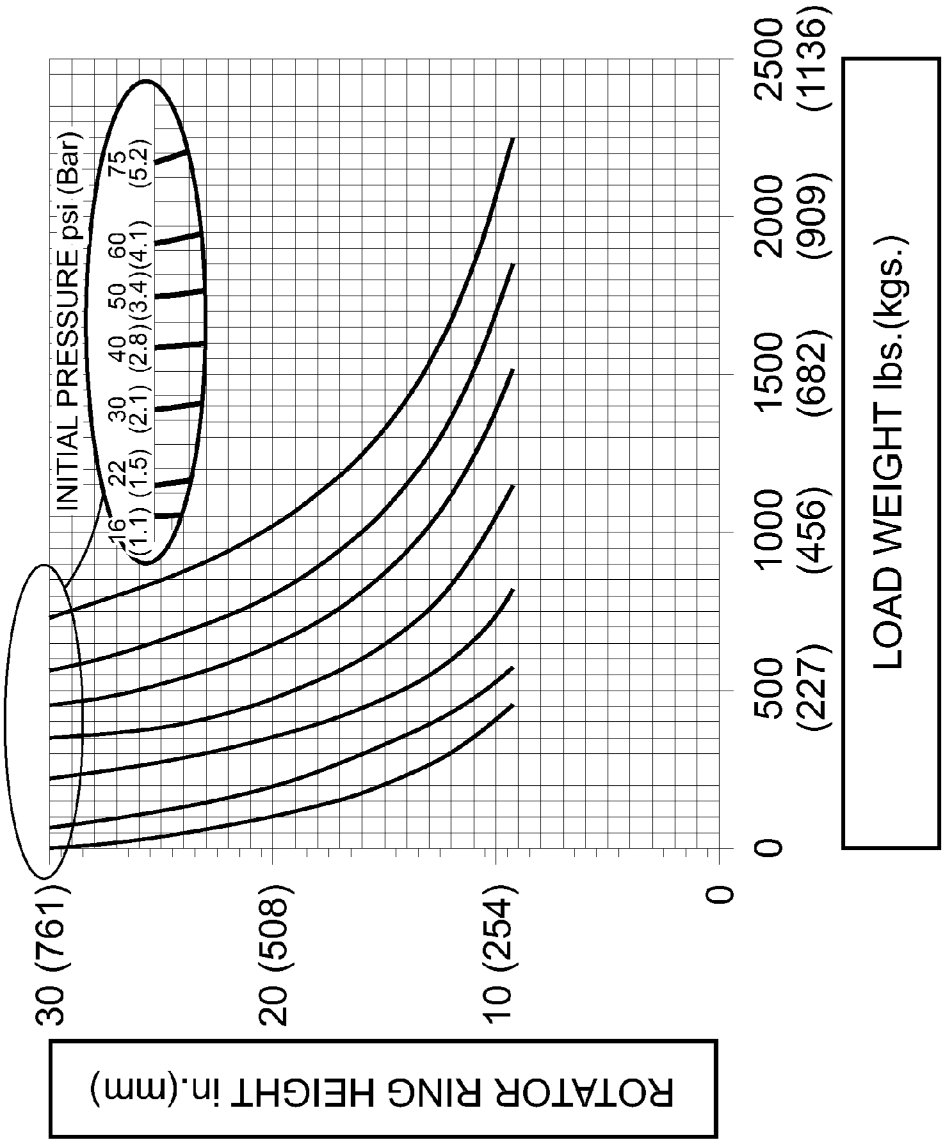
FIG. 1 (PRIOR ART)
FIG. 1 is a plot of prior-art performance graphs showing the height of the elevator platform as a function of load for various initial air pressures in the pneumatic system.

The structure and operation of conventional self-adjusting elevators, such as the one described in U.S. Pat. No. 5,299,906, are well known in the art; therefore, they will not be described in detail in this disclosure beyond what is necessary to explain the advance provided by the present invention. As shown in FIG. 1, for each pressure applied to its pneumatic system, the elevator is characterized by a set load-versus-height travel performance. The improvement of the invention lies in the addition of several reservoirs that may be connected in modular fashion to change the overall volume of the pneumatic system. In so doing, the working volume is changed and the performance curve is varied to a different travel path that produces a more desirable working height. As illustrated schematically in FIG. 3 as an exemplary embodiment of the invention, the bellows 18 is pressurized directly by a conventional main reservoir 22. Two additional reservoirs 24 and 26 are provided to augment the capacity of the elevator's pneumatic system. (Note that reservoir 26 is illustrated as a pair of connected tanks because so implemented in the preferred embodiment of the invention, but it is effectively a single reservoir.) Each of reservoirs 24 and 26 is connected to the main reservoir 22 by means of respective valves 28 and 30 that allow the independent incorporation of either or both reservoirs into the pneumatic system of the elevator.

Figure 3:
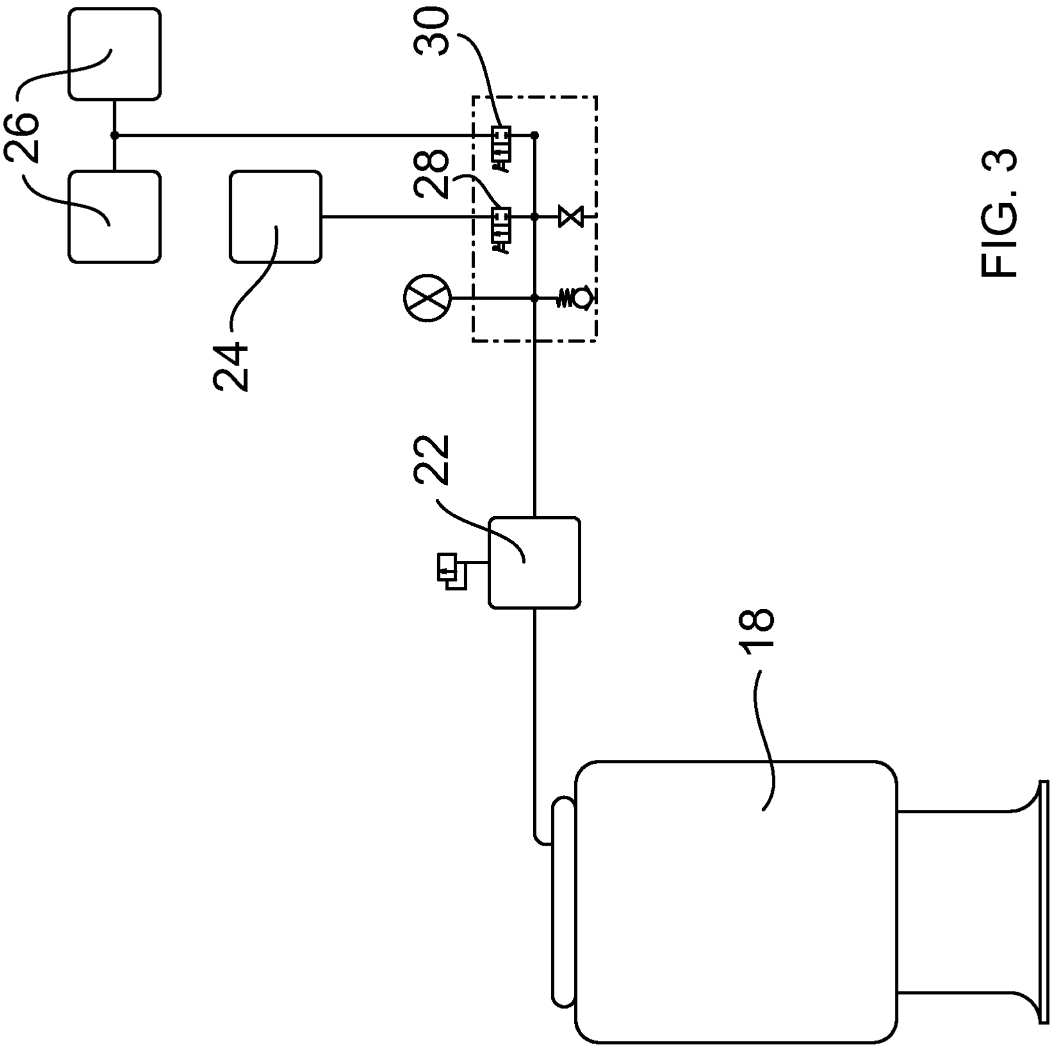
FIG. 3 is a schematic representation of a pneumatic system according to the invention.

In FIG. 3 the valves show reservoirs 24 and 26 connected independently in parallel to reservoir 22, so that either one or both could be incorporated into the working system. This configuration would afford four operating modes (only reservoir 22; reservoirs 22 and 24; reservoirs 22 and 26; and reservoirs 22, 24 and 26). However, in the current preferred embodiment of the elevator the two tanks 24,26 are connected in series for simplicity of operation. Therefore only three operating modes are provided (only reservoir 22; reservoirs 22 and 24; and reservoirs 22, 24 and 26).

Figure 4:
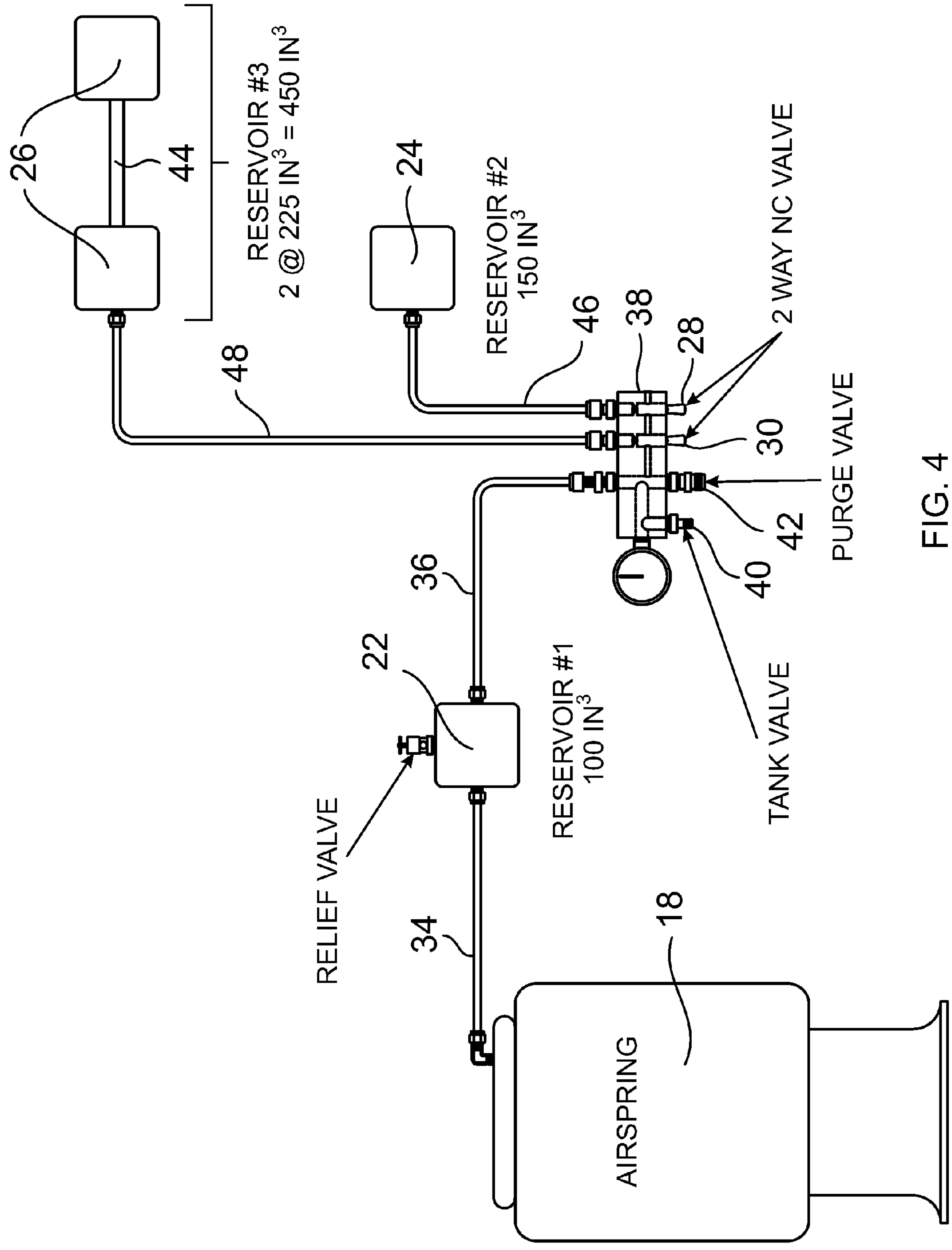
FIG. 4 is a schematic representation of the pneumatic system of the preferred embodiment of the invention.
Figure 5:
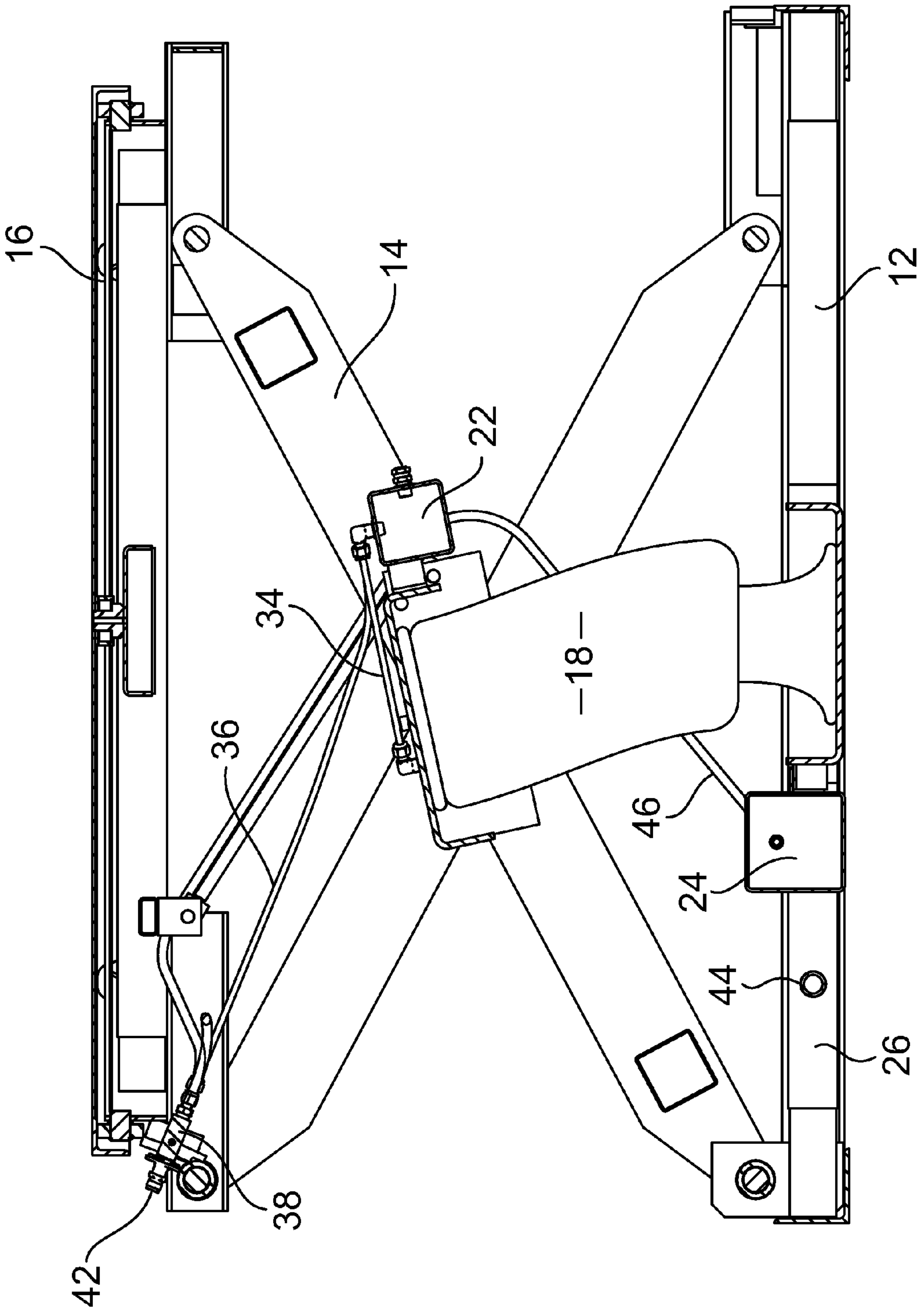
FIG. 5 is a partially cut-out elevational view of the load elevator of FIG. 2 showing the various reservoirs of the invention and the system of hoses connecting them to the air actuator.
Figure 6:
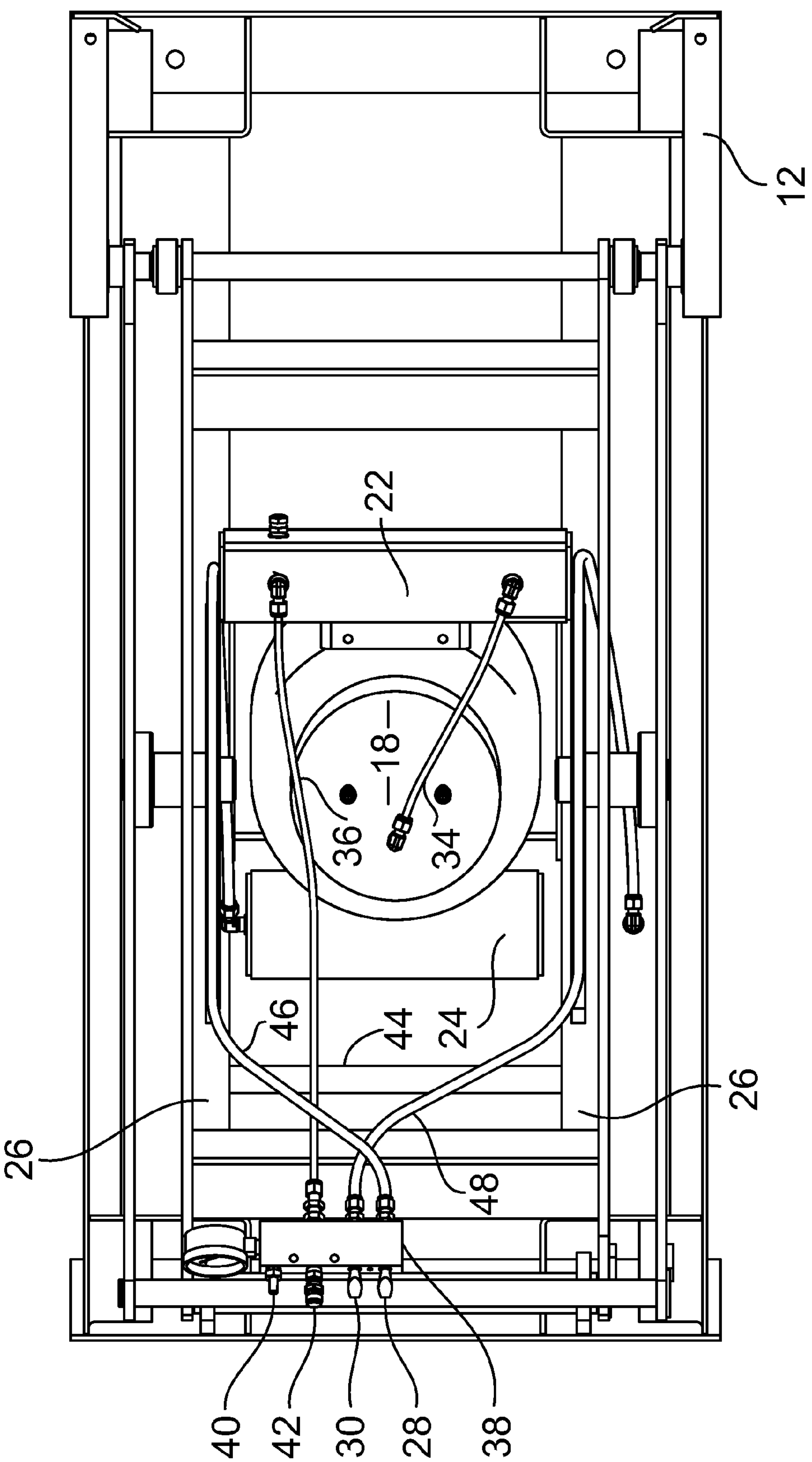
FIG. 6 is a top view of the load elevator of FIG. 2 (without the platform) showing the pneumatic system of the invention.

FIG. 4 shows a schematic representation of the pneumatic system currently installed in the prototype of the invention. The volume of the system is increased by a predetermined amount when valve 30 is opened (adding reservoir 26) and then again when valve 28 is opened (adding reservoir 24). As the volume of the pneumatic system of the elevator is so increased, the effect of the compression of the bellows on the original pressure produced by the addition of weight on the platform is diluted, thereby changing its travel performance and decreasing the weight at which the platform reaches its minimum height. FIG. 5 illustrates an actual implementation of the invention, wherein the main reservoir 22 is mounted directly next to the air actuator 18 and is connected to it by means of a flexible hose 34. Another hose 36 connects the reservoir 22 to a manifold 38 that includes a tank valve 40 and a purge valve 42 for pressurization and purging, respectively. The manifold also includes valves 28 and 30 to electively couple the additional reservoirs 24 and 26 to the elevator's pneumatic system, respectively. As seen in the top view of FIG. 6 (shown without the platform 16), the reservoir 26 consists of two separate lateral tanks in the base connected by a pipe 44. Flexible hoses 46 and 48 also connect the manifold 38 to reservoirs 24 and 26, respectively.

Figure 7:
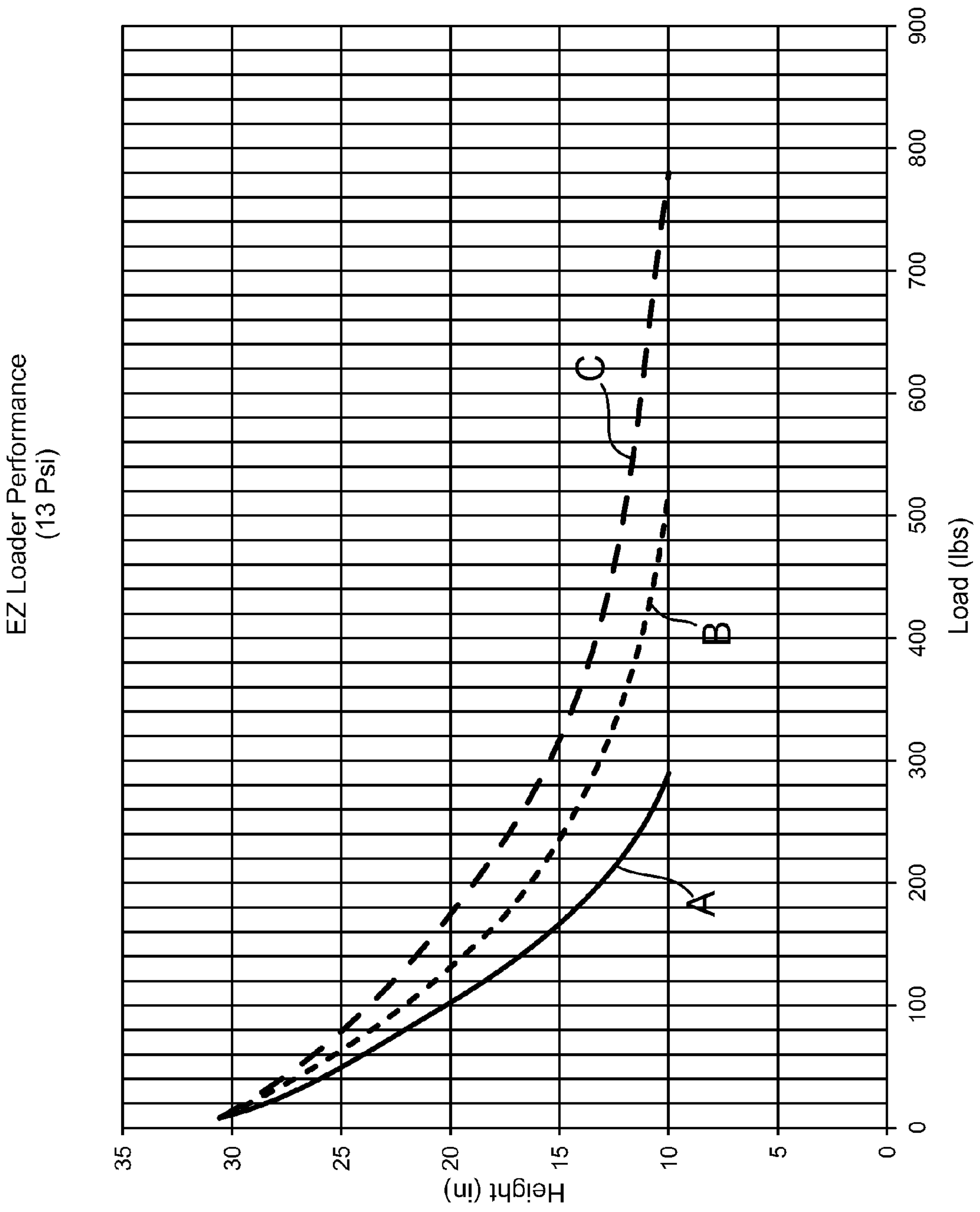
FIG. 7 is a plot of performance curves (platform elevation as a function of load) for the elevator having the specifications shown in FIG. 4 when the pneumatic system is pressurized to 13 psi.
Figure 8:
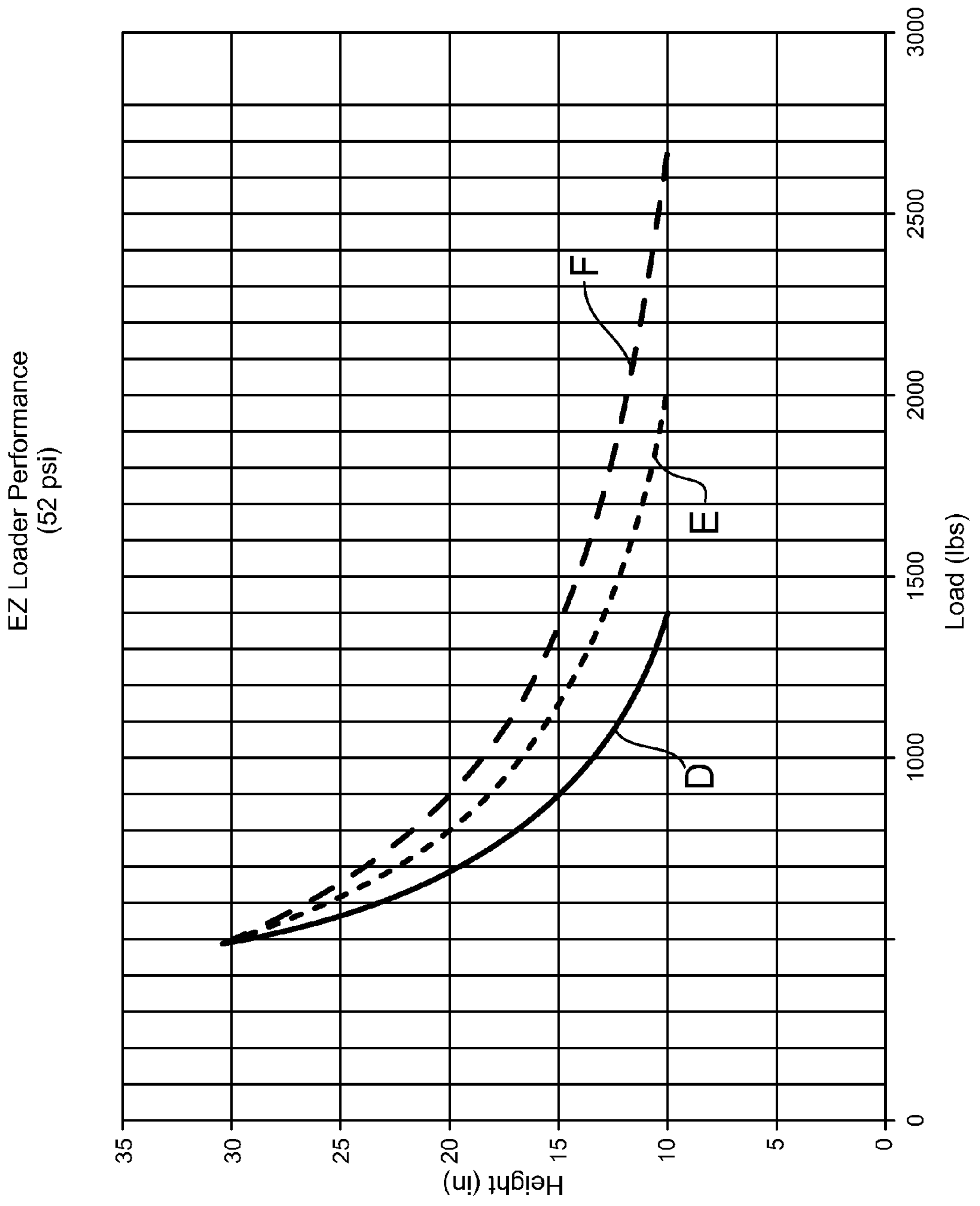
FIG. 8 is a plot of performance curves (platform elevation as a function of load) for the elevator having the specifications shown in FIG. 4 when the pneumatic system is pressurized to 52 psi.

As a result of this configuration and the relative capacities of reservoirs 22, 24 and 26, the performance of the elevator of the invention is advantageously improved in range and flexibility. For example, as illustrated by the performance curves of FIG. 7, when the bellows 18 and all reservoirs (22, 24 and 26) are pressurized to an initial pressure of 13 psi, the elevator may be operated so as to bottom out at a load of about 290 pounds (plot A) when all reservoirs are connected, or at about 520 pounds (plot B) when only reservoir 22 and 24 are connected, or at about 780 pounds (plot C) when only reservoir 22 is coupled operationally to the pneumatic system. Similarly, as illustrated by the performance curves of FIG. 8, with an initial pressure of 52 psi in the bellows and all reservoirs the elevator may be operated so as to bottom out at a load of about 1,400 pounds (plot D), or at about 2,000 pounds (plot E), or at about 2,650 pounds (plot F) when all reservoirs, or reservoir 22 and 24, or only reservoir 22, respectively, are connected to the pneumatic system.

Thus, an improved self-adjusting load elevator has been described that enables an operator to change its performance to accommodate loads of varying density so as to maintain the height of the work surface (i.e., the top of the material loaded on the elevator's platform) at a convenient position during the entire loading process. This is achieved by connecting to the pneumatic system the combination of reservoirs that provides the most useful platform descent as more and more weight is placed on it. As such, the invention affords different modes of operation heretofore only available by changing the pressure of the system by adding or removing air from the system.

In essence, the invention eliminates the need to change the initial pressure of the system to conform to the density of the load at hand. Instead, the performance curve is changed to increase or decrease the maximum load required to lower the platform completely by varying the volume of the system (thereby varying the slope of the performance curve).

While the invention has been shown and described in what is believed to be the most practical and preferred embodiment, it is recognized that departures can be made therefrom within the scope of the invention. For example, the invention has been described in terms of two additional reservoirs of particular capacities with attendant valving to produce the performance illustrated in FIGS. 7 and 8, but it is understood that different numbers of reservoirs of varied sizes and connected in correspondingly different combinations could be used in the same manner to practice the invention so as to produce different performances of interest. It is similarly understood that the invention could be implemented with any gas (not only air) and with a lift actuated by a bellows regardless of the specific type and connection to the support framework, whether a scissor mechanism or another kind of extendible support, such as a telescopic cylinder. Therefore, the invention is not to be limited to the details disclosed herein, but is to be accorded the full scope of the claims so as to embrace any and all equivalent apparatus and methods.

I claim:

1. A load elevator comprising:

a base;

a load platform mechanically coupled to the base and moveable between an extended position and a retracted position with respect to the base;

a pneumatic actuator adapted to support the platform between said retracted and extended positions, said pneumatic actuator being pressurized at an actuator pressure; and a pneumatic system with a plurality of reservoirs connected to the pneumatic actuator through a direct pneumatic connection;

wherein said reservoirs include respective valves for alternative uninterrupted pneumatic connection to the pneumatic actuator during operation with correspondingly alternative fixed volume capacities of the pneumatic system for different closed-pneumatic-system modes of operation of the load elevator, each of said reservoirs being pneumatically pressurized to said actuator pressure when pneumatically connected to the pneumatic actuator and during each of said different modes of operation of the load elevator.

2. The elevator of claim 1, wherein said base and platform are coupled by means of a scissor mechanism.

3. The elevator of claim 2, wherein said pneumatic actuator is connected to the base and to the scissor mechanism.

4. The elevator of claim 3, wherein said pneumatic system comprises a main reservoir coupled to the pneumatic actuator, a second reservoir coupled to the main reservoir, and a third reservoir coupled to the main reservoir.

5. The elevator of claim 4, wherein said second and third reservoirs have different volumes.

6. The elevator of claim 1, wherein said pneumatic system comprises a main reservoir coupled to the pneumatic actuator, a second reservoir coupled to the main reservoir, and a third reservoir coupled to the main reservoir.

7. The elevator of claim 6, further including a tank valve for pressurizing the pneumatic system and a purge valve for purging the pneumatic system.

8. In a load elevator including a base, a load platform mechanically coupled to the base by means of a scissor mechanism and moveable between an extended position and a retracted position with respect to the base, and a pneumatic actuator pressurized at an actuator pressure and coupled to the scissor mechanism, the improvement comprising a pneumatic system with a plurality of reservoirs connected to the pneumatic actuator through a direct pneumatic connection, said reservoirs including respective valves for alternative uninterrupted pneumatic connection to the pneumatic actuator during operation with correspondingly alternative fixed volume capacities of the pneumatic system for different closed-pneumatic-system modes of operation of the load elevator, each of said reservoirs being pneumatically pressurized to said actuator pressure when pneumatically connected to the pneumatic actuator and during each of said different modes of operation of the load elevator.

9. The elevator of claim 8, wherein said pneumatic actuator is connected to the base and to the scissor mechanism.

10. The elevator of claim 9, wherein said pneumatic system comprises a main reservoir coupled to the pneumatic actuator, a second reservoir coupled to the main reservoir, and a third reservoir coupled to the main reservoir.

11. The elevator of claim 10, wherein said second and third reservoirs have different volumes.

12. The elevator of claim 8, wherein said pneumatic system comprises a main reservoir coupled to the pneumatic actuator, a second reservoir coupled to the main reservoir, and a third reservoir coupled to the main reservoir.

13. The elevator of claim 12, further including a tank valve for pressurizing the pneumatic system and a purge valve for purging the pneumatic system.

* * * * *